March 31, 1942.   M. A. ENQUIST   2,277,750
VALVE
Filed June 24, 1941   2 Sheets-Sheet 1
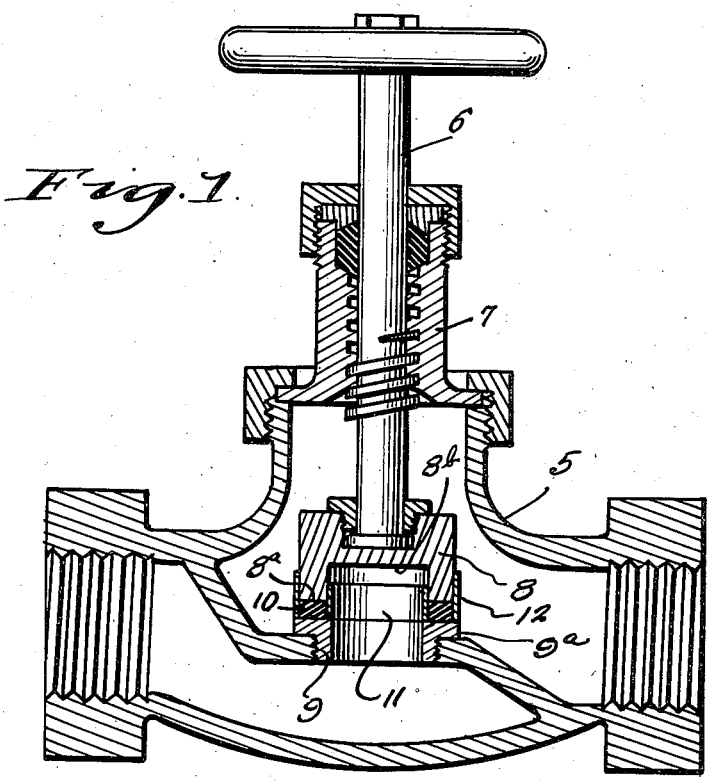
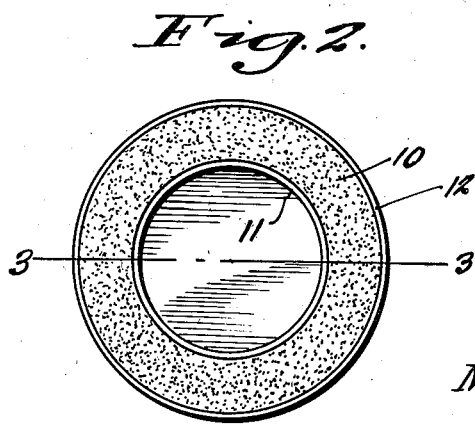
Inventor
Melvin Anderson Enquist
By Clarence A. O'Brien
Attorney

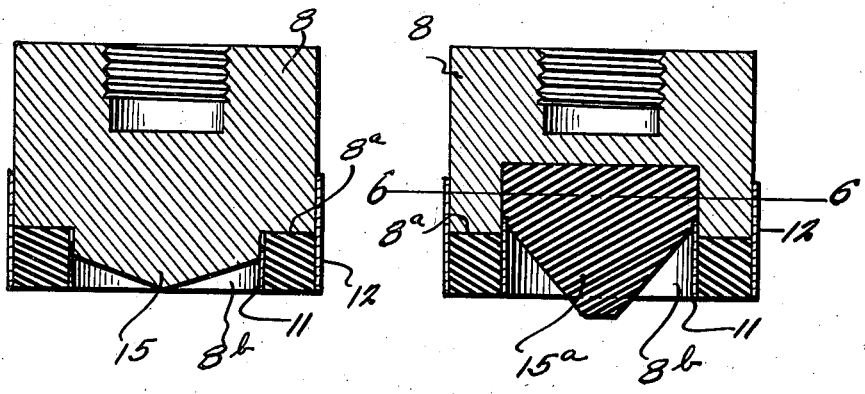
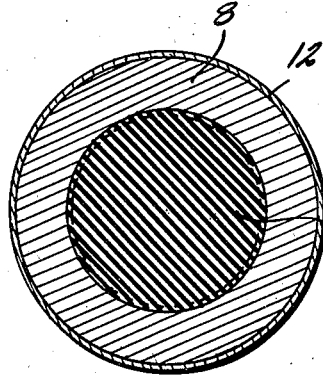

Patented Mar. 31, 1942

2,277,750

UNITED STATES PATENT OFFICE 2,277,750

VALVE

Melvin Anderson Enquist, Sugar Land, Tex.

Application June 24, 1941, Serial No. 399,508

2 Claims. (Cl. 251—160)

This invention relates to valves, and more particularly to the seating arrangement of such valves.

In accordance with the present invention improved means is provided to assure proper seating of the valve plug when the valve is in closed condition and while, as will be apparent from the description as it proceeds, I have illustrated the invention as applied to the well-known type of globe valve, the invention may be applied to other equally well-known types of valves.

More particularly the invention has reference to the types of valves which, generally speaking, embody a valve plug having at its seating end a ring or annulus of rubber to engage the valve seat.

Due to the present construction of such valves this ring or annulus of rubber is subjected to such treatment as causes the rubber to wear and deteriorate within a comparatively short time thus interfering with proper seating of the valve. It is to overcome the objections to such seating arrangement that constitutes the object, intent and purpose of the present invention.

The present invention together with its objects and advantages will be best understood from a study of the following description taken in connection with the accompanying drawings wherein:

Figure 1 is a view mostly in section through a well-known type of globe valve illustrating the application of my invention thereto.

Figure 2 is a bottom plan view of a valve plug having my invention applied thereto.

Figure 3 is a vertical sectional view through the valve plug taken substantially on the line 3—3 of Figure 2.

Figures 4, 5 and 7 are vertical sectional views through various types of valve plugs illustrating the application of the invention thereto.

Figure 6 is a horizontal sectional view taken substantially on the line 6—6 of Figure 5.

Referring more in detail to the drawings it will be seen that 5 indicates generally the casing of a globe valve while 6 indicates the valve-operating stem working through the bonnet 7 and the reference numeral 8 indicates the valve plug. The seat for the valve plug 8 is indicated by the reference numeral 9.

As previously stated while I have herein illustrated the invention as applied to a globe valve, it will be readily appreciated by those skilled in the art that the invention may be equally applicable to other types of valves.

In accordance with the present invention a removable valve seat 9 is shown, and the same is constructed with a departure from the conventional by having the annular seat portion 9a thereof smooth and flat on its top surface as distinguished from the conventional structure, which usually consists of an annular upstanding rib on the seat part 9a.

Further in accordance with the present invention the plug 8 is constructed with a departure from the conventional; the conventional structure generally embodying at the seating end or edge of the plug an annular groove in which is seated an annulus or ring of rubber. This ring or annulus of rubber, which serves as a gasket, in the conventional structure, seats on the annular upstanding rib of the seat, and as the valve plug is moved to seated position this annular rib exerts an expanding pressure on the annular rubber, or rubber ring in a manner to provide a tight joint or seating engagement between the plug and the seat.

Such a conventional structure as above described is objectionable for the reason that the rubber annulus or rubber ring is subjected to such wear that it rapidly deteriorates thus materially interfering with a proper seating of the valve plug and consequently reducing the effectiveness of the valve.

To overcome these objections, I vulcanize to the seating end 8a of the plug 8 an annulus or ring 10 of rubber.

Further I provide inner and outer metallic rings or annuli 11, 12, and between the rings 11 and 12 the rubber ring 10 is placed and has its inner and outer edges vulcanized to the rings 11 and 12.

The outer ring 12 slidably embraces the plug body 8 while the inner ring conformably fits within the hollow 8b of the plug as shown in Figure 1.

Thus it will be appreciated that while the ring 10 of rubber is vulcanized to the edge 8a of the plug 8 and also to the rings 11 and 12, said rings 11 and 12 are free to shift longitudinally relative to the body 8.

It will also be noted that the seat-contacting surface of the rubber ring 10 is flush with the leading edges of the rings 11 and 12 so that said surface of the ring 10 and leading edges of the metallic rings 11 and 12 will rest flatly on the flat seat part 9a of the valve seat 9.

As pressure is applied to the plug 8 by the turning of the stem 6 effecting a seating of the plug on the seat 9, rings 11 and 12 are free to shift, as it were, upwardly with respect to the plug, or as otherwise stated, the plug body 8 is free to shift downwardly relative to the rings 11 and 12 in applying pressure to the ring engaged with the seat 9. When the lateral pressure of the rubber ring 10 against the metallic rings 11 and 12 substantially equals the pressure exerted by the stem 6 on the rubber 10 relative movement of the plug 8 and rings 11 and 12 is prevented, and a tight, positive seating engagement is effected between the plugs and its seat.

When desired, relative movement of the plug body 8 and the ring assembly 11, 12 can be adjustably controlled by, as shown in Figure 7, providing the plug body 8 with external threads 13 in order to receive an externally threaded stop ring 14 which embraces the body 8 above the outer ring 12.

It will thus be seen that the stop ring 14 may be secured at the desired position of adjustment on the body 8 in the path of the ring 12 and is thus positioned to be abutted by the ring 12 in the event there is such a shifting of the ring 12 and associated parts relative to the body 8 that exceeds an amount predetermined by proper adjustment of the ring 14 on the plug body 8.

In Figure 4 I have illustrated the application of the invention to a plug body characterized by having in the hollow 8b thereof an integral pilot formation 15; while in Figure 5 I have illustrated the invention as applied to a type of plug body which has vulcanized thereto or otherwise secured within the hollow 8b thereof, a pilot 15a of rubber or analogous resilient material.

It will also be understood that, in accordance with the present invention, the ring 10 may be formed of hard vulcanized rubber, or of synthetic rubber such as neoprene, Thiokol, Ameripol, etc.; while the rings 11 and 12 may be formed of either a metallic substance, as herein described, or of any suitable non-metallic substance of suitable properties such as hard rubber, or any of the resins, etc.

It is believed that the invention together with its many advantages will be clear to those skilled in the art without further detailed description.

Having thus described the invention what is claimed as new is:

1. As a new article of manufacture, a plug valve of circular shape in cross-section and having an annular recess in its lower end providing an annular lower flange, the internal and external walls of which are plain, a ring of resilient material having its upper edge vulcanized to the lower end of the flange and said ring being of the same width of the flange, and a pair of rings of hard material and of narrow cross-sectional shape, one ring being vulcanized at its lower end to the inner side of the resilient ring and the other to the outer side of the resilient ring, the narrow rings having their lower edges flush with the bottom edge of the resilient ring and the upper portions of the narrow rings having sliding contact with the flange.

2. As a new article of manufacture, a plug valve of circular shape in cross-section and having an annular recess in its lower end providing an annular lower flange, the internal and external walls of which are plain, a ring of resilient material having its upper edge vulcanized to the lower end of the flange and said ring being of the same width of the flange, and a pair of rings of hard material and of narrow cross-sectional shape, one ring being vulcanized at its lower end to the inner side of the resilient ring and the other to the outer side of the resilient ring, the narrow rings having their lower edges flush with the bottom edge of the resilient ring and the upper portions of the narrow rings having sliding contact with the flange, and a pilot member located in the recess and having a depending tapered portion.

MELVIN ANDERSON ENQUIST.